United States Patent [19]
Bradford

[11] 4,170,173
[45] Oct. 9, 1979

[54] BARBECUE

[76] Inventor: Lovell O. Bradford, 3671 Elston Dr., San Bruno, Calif. 94066

[21] Appl. No.: 864,128

[22] Filed: Dec. 23, 1977

[51] Int. Cl.² .......................................... A47J 37/04
[52] U.S. Cl. .................................. 99/341; 99/421 H; 99/446
[58] Field of Search ............. 99/341, 446, 447, 421 H, 99/421 R; 126/25 R, 25 A, 25 AA, 25 B, 25 C

[56] References Cited
U.S. PATENT DOCUMENTS

| | | | |
|---|---|---|---|
| 948,717 | 2/1910 | Avery | 126/25 R |
| 1,169,168 | 1/1916 | Lane et al. | 99/446 |
| 2,608,190 | 8/1952 | Winning et al. | 126/25 R |
| 3,324,788 | 6/1967 | La France | 99/446 |
| 3,556,078 | 1/1971 | McGaughey | 126/25 R |
| 3,665,913 | 5/1972 | Cagle, Jr. | 126/25 A |

*Primary Examiner*—George F. Mautz
*Attorney, Agent, or Firm*—Townsend and Townsend

[57] ABSTRACT

A barbecue is fabricated from a cylindrical metal drum which is disposed with its axis horizontal. A dish made of transparent, heat-resistant glass is mounted in an aperture in the lid of the barbecue to provide a window. A plurality of vents are cut in the lower portion of the drum and fire brick is laid in the interior of the drum above the vents. The drum rests atop a scroll assembly which in turn rests atop a platform which is supported by vertically extending legs of a carriage. A plurality of turnbuckle assemblies connect the drum to the legs and may be tightened so that the drum, the scroll assembly, the platform, and the carriage are rigidly secured together. Air can flow through an interval between the drum and the scroll assembly, through the vents to burning coals supported on the fire brick. When the coals are extinguished, water can be sprayed into the interior of the drum and the ashes and water will flow through holes in the bricks, through the vents, onto the scroll assembly, and off of either end of the scroll assembly.

12 Claims, 3 Drawing Figures

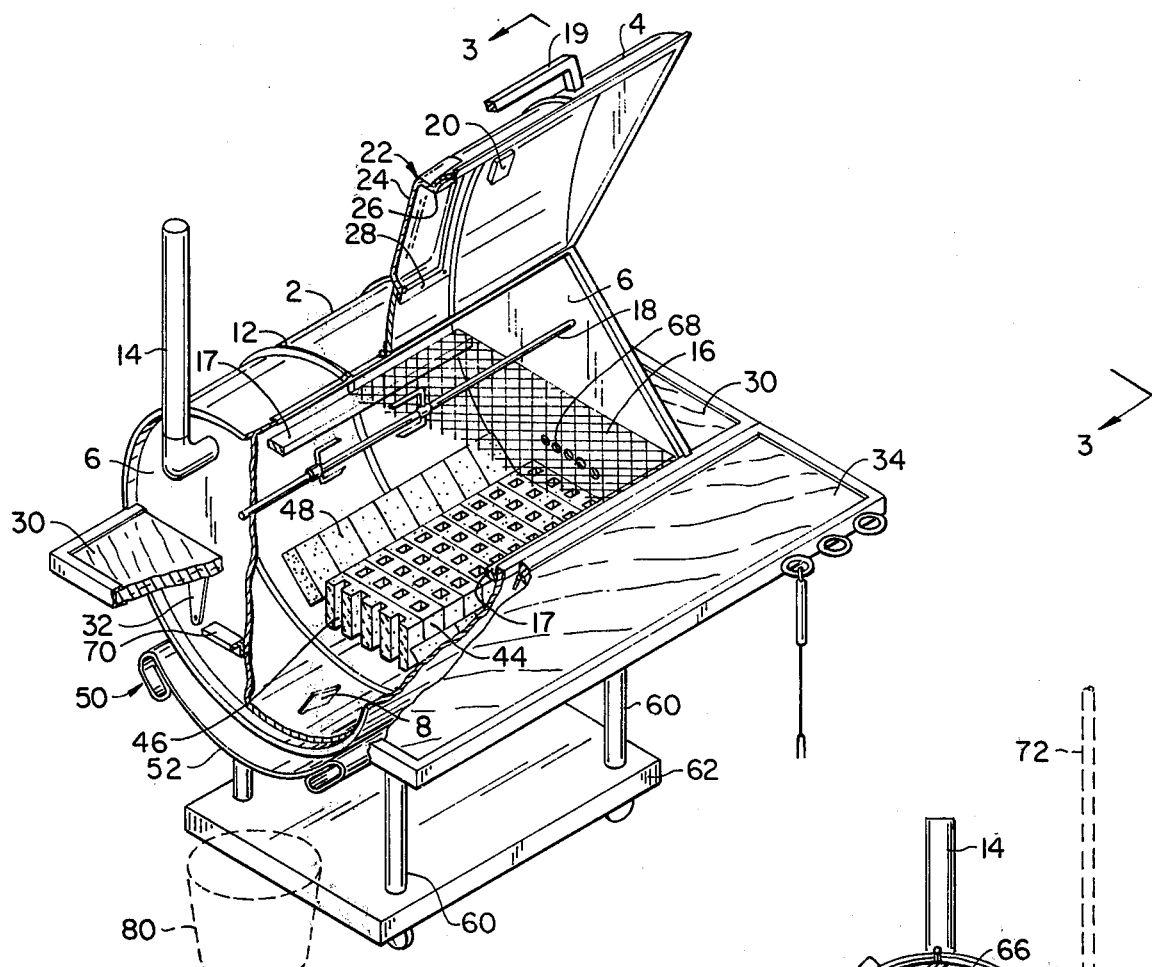
FIG._1.
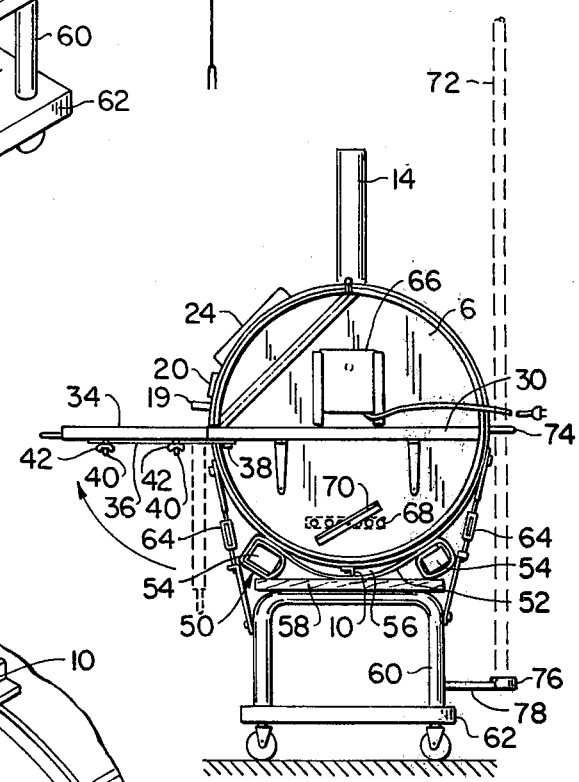
FIG._3.
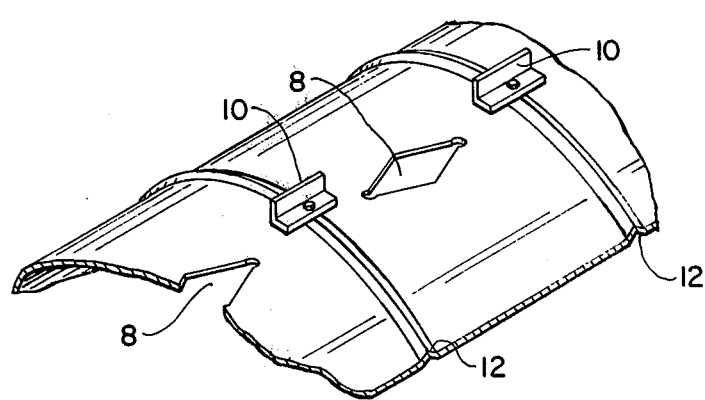
FIG._2.

BARBECUE

BACKGROUND OF THE INVENTION

This invention relates to barbecues and more particularly to a barbecue fabricated from a cylindrical metal drum which is provided with an improved window and a combination vent, ash drain, and support system.

U.S. Pat. No. 2,909,170, U.S. Pat. No. 3,459,171 and U.S. Pat. No. Des. 196,552 disclose barbecues whose major structural components could be fashioned from a cylindrical metal drum. U.S. Pat. No. 3,692,013 discloses a cooking grill which has a plurality of vent holes at the bottom of its housing, however, since the grill is gas-fired and utilizes a plurality of ceramic briquettes there is no teaching or suggestion of washing ashes from the barbecue through the vents.

SUMMARY OF THE INVENTION

A barbecue is fabricated from a cylindrical metal drum which is disposed with its axis horizontal. An upper portion of the drum is cut and hinged upwardly to define a lid. A dish made of transparent, heat-resistant glass is mounted in an aperture in lid to provide a window. A combination vent, ash drain, and support system is provided at the lower portion of the drum. A plurality of vents are cut in the lower portion of the drum and fire brick is laid in the interior of the drum above the vents. A scroll assembly is formed by rolling an opposite pair of edge portions of a metal sheet around elongate members. The drum rests atop the scroll assembly so that its axis is generally parallel with the elongate members. Spacers mounted to the outside of the lower portion of the drum space the intermediate portion of the scroll assembly away from the drum. The scroll assembly in turn rests atop a platform which in turn is supported by spaced apart, vertically extending legs of a carriage. A plurality of turnbuckle assemblies connect the drum to the legs and may be tightened so that the drum, the scroll assembly, the platform, and the carriage are rigidly secured together. Air can flow through the interval between the drum and the scroll assembly, through the vents to burning coals supported on the fire brick. When the coals are extinguished, water can be sprayed into the interior of the drum and the ashes and water will flow through holes in the bricks, through the vents, onto the scroll assembly, and off of either end of the scroll assembly.

An object of this invention is to provide an improved window for a barbecue. According to this aspect of the invention, a dish made of transparent heat-resistant glass is utilized. Such dishes are usually capable of withstanding high temperatures and high impact forces without cracking or breaking. A damaged dish can be easily replaced. A large window is provided which allows the food to be viewed during the barbecue cooking process.

Another object of this invention is to provide an improved vent, ash drain, and support system for a barbecue. Sufficient ventilation for optimum burning of the coals is achieved. When the coals are extinguished, the interior of the barbecue can be easily and quickly cleaned. The drum is firmly mounted to the carriage.

Other objects and advantages of the present invention will become more apparent from the following detailed description of the preferred embodiment taken in conjunction with the drawings.

BRIEF DESCRIPTION OF THE DRAWINGS

FIG. 1 is a perspective view of the barbecue of the present invention with portions broken away.

FIG. 2 is a fragmentary view of the outside of the lower portion of the drum showing the diamond-shaped vents and the spacers.

FIG. 3 is an end view of the barbecue taken along lines 3—3 of FIG. 1.

DESCRIPTION OF THE PREFERRED EMBODIMENT

Referring to FIG. 1, the barbecue of the present invention is fabricated from a cylindrical metal drum 2 which is disposed with its axis horizontal. A lid 4 is cut from the upper portion of the drum in the following manner. A pair of parallel cuts, spaced apart 90°, are made in the sidewall of the drum and extend between the ends 6 of the drum. Cuts are made in the ends 6 along chords which connect the ends of the sidewall cuts. Appropriate lengths of L-shaped aluminum stock may be secured to the cut edges of drum 2 if desired.

Referring to FIG. 2, a plurality of axially spaced, diamond-shaped vents 8 are cut in the lower portion of drum 2. A plurality of spacers 10 are mounted to the ribs 12 of drum 2.

Referring again to FIG. 1, a stack 14 is mounted to the spout of the drum. Stack 14 is preferably tall enough so that smoke from the interior of the barbecue will escape clear of the cook.

A removable grill 16 rests in drum 2 on top of support bars 17 at a level which corresponds to the diameter of the drum. A spit 18 is mounted in the drum above grill 16. It is also possible to mount a smaller grill in the drum at the level of the spit. Since the smaller grill is farther away from the burning coals than grill 16, it can be used for slow cooking.

Lid 4 is hinged upwardly and may be opened by grasping handle 19. Mounted in lid 4 is a thermometer 20 and a window generally designated 22 which incorporates a dish 24 made of relatively thick, transparent, heat-resistant glass such as that sold under the trademark PYREX. An aperture is cut in lid 4 which is just large enough to receive the body portion of dish 24. The lip 26 of dish 24 is held rigidly against portions of lid 4 which are adjacent the aperture by brackets 28 which are fastened to lid 4 with screws. A large window is provided which allows the food to be viewed when lid 4 is closed. Dish 24 is capable of withstanding high temperatures and high impact forces without cracking or breaking. If dish 24 is damaged, it can easily be replaced by removing brackets 28.

Shelves 30 are mounted to ends 6 with L-brackets 32. A raisable and lowerable apron 34 is hingedly mounted to the front of drum 2 and as shown in FIG. 3 it is supported in its raised position by struts 36 which are rotatably mounted to shelves 30 by bolts 38. Struts 36 have notches (not shown) which receive the shanks of bolts 40 secured through apron 34 when the struts are supporting apron 34. Wing nuts 42 may be tightened to secure apron 34 and struts 36 together.

Referring again to FIG. 1, fire bricks 44 are laid in the interior of drum 2 above vents 8. Fire bricks 44 have holes 46 which extend through them and allow air to flow through to burning coals (not shown) supported on the bricks. Holes 46 are too small to permit individual coals to fall through. Fire bricks 44 are capable of withstanding the high temperatures associated with burning coals. Red clay bricks 48 are laid on either side of fire bricks 44. The bricks distribute the heat from the burning coals evenly throughout the drum for optimum cooking.

A support system for the barbecue is constructed in the following manner. A scroll assembly 50 is formed by rolling an opposite pair of edge portions of a metal sheet 52 around respective elongate members such as wooden boards 54 (see FIG. 3). As shown in FIG. 3, drum 2 rests atop scroll assembly 50 so that the axis of the drum is generally parallel with boards 54. Spacers 10 space the intermediate portion of metal sheet 52 away from drum 2 to define an interval 56. Scroll assembly 50 rests atop a platform 58 which is in turn supported by spaced apart, vertically extending legs 60 of a carriage 62. (See FIGS. 1 and 3.)

As shown in FIG. 3, a plurality of turnbuckle assemblies 64 connect drum 2 to legs 60 and may be tightened so that drum 2, scroll assembly 50, platform 58 and carriage 62 are rigidly secured together under tension.

An electric motor 66 which rotates spit 18 is mounted on one of the ends 6. A plurality of holes such as 68 are cut in each end 6 and covers such as 70 are rotatably mounted adjacent the holes. Covers 70 can be selectively rotated to cover all or part of holes 68 in order to vary the amount of air supplied to the burning coals. The pole 72 (shown in phantom lines) of an umbrella (not shown) may be inserted through a U-shaped bracket 74 secured to drum 2 and its end is placed in the cup 76 of an arm 78 secured to carriage 62.

Air pulled into the barbecue by natural draft can flow through interval 56, through vents 8, and through holes 46 of fire bricks 44 to burning coals supported on the bricks. When the coals are extinguished, water can be sprayed into the interior of drum 2 and the ashes and other debris will flow through holes 46 in fire bricks 44 and through the crevices between the bricks, through vents 8, onto scroll assembly 50, through interval 56 and off of either end of the scroll assembly. As shown in FIG. 1, buckets such as 80 (shown in phantom lines) can be placed beneath the ends of the scroll assembly to collect material washed from the interior of the drum.

I claim:

1. A barbecue comprising:
   a housing for supporting a grill or a spit above a heat source, the housing having a plurality of vents in its lower portion;
   means defining an open-ended trough beneath the housing or catching water and ashes flowing from the housing through the vents when the interior of the housing is washed and for permitting the water and ashes to pass out an open end of the trough, the trough having a bottom and a pair of spaced upper edges, the upper edges being disposed at an elevation at least as high as the highest of the plurality of vents;
   means for spacing the housing and the bottom of the trough apart;
   means for supporting the housing, the trough, and the spacing means; and
   means for holding the housing, the trough, the spacing means, and the supporting means rigidly together.

2. A barbecue according to claim 1 wherein the upper edges of the trough contact the lower portion of the housing, thereby defining in cooperation with the housing an open ended interval in communication with the vents.

3. A barbecue comprising:
   at least a part of a cylindrical metal drum, the drum disposed with its axis horizontal and having a plurality of axially spaced vents in its lower portion;
   a generally rectangular metal sheet, an opposite pair of edge portions of the sheet being coiled, the sheet disposed beneath the lower portion of the drum with its coiled portions in contact with the drum and generally parallel with the axis of the drum;
   means for spacing the exterior of the lower portion of the drum from the intermediate portion of the sheet;
   a platform beneath the sheet;
   means for supporting the platform; and
   means connected between the drum and supporting means for holding the drum, the sheet, the spacing means, the platform, and the supporting means rigidly together under tension.

4. A barbecue according to claim 3 wherein the sheet is large enough to receive water flowing from the drum through the vents when the interior of the drum is washed.

5. A barbecue according to claim 3 wherein the edge portions of the sheet are coiled around respective rigid elongate members in scroll fashion.

6. A barbecue according to claim 3 wherein the holding means includes a plurality of turnbuckles and means for connecting the one ends of the turnbuckles to the drum and the other ends of the turnbuckles to the supporting means.

7. A barbecue according to claim 3 and further comprising a horizontally extending apron mounted around at least a portion of the drum, at least one segment of the apron being hingedly attached to the drum so that it can swing downwardly from a horizontal position to a substantially vertical position, and means for releasably holding the one segment in its horizontal position.

8. A barbecue according to claim 3 wherein the upper portion of the drum is cut and hinged upwardly to provide a lid.

9. A barbecue according to claim 8 wherein the lid has a window through which the interior of the drum can be viewed when the lid is closed, the window including a dish made of transparent, substantially heat-resistant glass, the dish having a lip at least partially surrounding its body portion, the dish being mounted in an aperture in the lid which is large enough to permit the body portion to pass therethrough but not large enough to permit the lip to pass therethrough; and means for holding the lip rigidly against the portions of the lid defining the aperture.

10. A barbecue comprising:
    at least a part of a cylindrical metal drum, the drum disposed with its axis horizontal, the drum having an upper portion which is cut and hinged upwardly to provide a lid, the lid having portions defining an aperture, the drum having a plurality of axially spaced vents in its lower portion;
    a window in the lid through which the interior of the barbecue can be viewed when the lid is closed, the window including a dish made of transparent, substantially heat-resistant glass, the dish having a lip at least partially surrounding its body portion, the dish being mounted in the aperture in the lid, the aperture being large enough to permit the body portion to pass therethrough, but not large enough to permit the lip to pass therethrough;

means for releasably holding the lip of the dish against the portions of the lid defining the aperture;

a generally rectangular metal sheet, an opposite pair of edge portions of the sheet being rolled around respective rigid elongate members in scroll fashion, the sheet disposed beneath the lower portion of the drum with its rolled portions in contact with the drum and parallel with the axis of the drum, the rolled sheet being large enough to receive water flowing from the drum through the vents;

means for spacing the outside of the lower portion of the drum from the intermediate portion of the rolled sheet to define an interval, the interval being large enough to permit a sufficient amount of air to pass therethrough, through the vents, and into the drum to allow for combustion of coals, and large enough to permit water carrying debris to pass from the drum, through the vents and through the interval for rapid washing of the interior of the drum;

a platform beneath the sheet;

means for supporting the platform including at least a pair of axially spaced, vertically extending legs; and means connected between the drum and the legs for holding the drum, the rolled sheet, the spacing means, the platform, and the supporting means rigidly together under tension.

11. A barbecue comprising:

at least a part of a cylindrical metal drum, the drum disposed with its axis horizontal and having a plurality of axially spaced vents in its lower portion;

a generally rectangular metal sheet disposed beneath the lower portion of the drum, the sheet defining an open-ended trough having edge portions in contact with the drum and an intermediate portion spaced from the lower portion of the drum;

means for supporting the sheet; and means connected between the drum and the supporting means for holding the drum, the sheet, and the supporting means rigidly together under tension.

12. A barbecue comprising:

at least a part of a cylindrical metal drum, the drum disposed with its axis horizontal, the drum having an upper portion which is cut and hinged upwardly to provide a lid, the drum having a plurality of axially spaced vents in its lower portion;

a generally rectangular metal sheet disposed beneath the lower portion of the drum, an opposite pair of edge portions of the sheet in contact with the drum and parallel with the axis of the drum, the sheet being large enough to receive water flowing from the drum through the vents;

means for spacing the outside of the lower portion of the drum from an intermediate portion of the rolled sheet to define an interval, the interval being large enough to permit a sufficient amount of air to pass therethrough, through the vents, and into the drum to allow for combustion of coals, and large enough to permit debris-laden water to pass from the drum, through the vents and through the interval for rapid washing of the interior of the drum;

means for supporting the sheet; and means connected between the drum and the supporting means for holding the drum, the sheet, the spacing means, and the supporting means rigidly together under tension.

* * * * *